United States Patent
Powell et al.

(10) Patent No.: US 10,764,535 B1
(45) Date of Patent: Sep. 1, 2020

(54) FACIAL TRACKING DURING VIDEO CALLS USING REMOTE CONTROL INPUT

(71) Applicant: Facebook, Inc., Menlo Park, CA (US)

(72) Inventors: Benjamin Powell, Mountain View, CA (US); Yanni Wang, Fremont, CA (US); Yuan Chang, Menlo Park, CA (US); Tomas Brennessl, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/601,475

(22) Filed: Oct. 14, 2019

(51) Int. Cl.
| | | |
|---|---|---|
| *H04N 7/01* | (2006.01) | |
| *H04N 7/14* | (2006.01) | |
| *G06T 7/11* | (2017.01) | |
| *G06T 7/20* | (2017.01) | |
| *G06K 9/00* | (2006.01) | |

(52) U.S. Cl.
CPC ......... *H04N 7/147* (2013.01); *G06K 9/00255* (2013.01); *G06T 7/11* (2017.01); *G06T 7/20* (2013.01); *G06T 2207/20132* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0066118 | A1* | 3/2008 | Igoe | H04L 12/2809 725/75 |
| 2008/0088698 | A1* | 4/2008 | Patel | H04N 7/15 348/14.09 |
| 2017/0374124 | A1* | 12/2017 | Parker | H04L 67/306 |
| 2018/0063482 | A1* | 3/2018 | Goesnar | H04N 5/2226 |
| 2019/0215464 | A1* | 7/2019 | Kumar | H04N 7/08 |

\* cited by examiner

*Primary Examiner* — Duc Nguyen
*Assistant Examiner* — Assad Mohammed
(74) *Attorney, Agent, or Firm* — Fenwick & West LLP

(57) ABSTRACT

A communication system enables users to select between individuals for tracking during video calls based on remote control input. The communication system establishes a video call session between a local client device and one or more remote client devices. The communication system uses a facial recognition algorithm to detect one or more faces from video data and obtains an identifier to each face. The communication system selects a first identifier. The communication system receives a navigation input from a remote control coupled to the communication system and, based on the input, selects a second identifier. The communication system receives an operation input and applies a center of focus of the video data to a second face corresponding to the second identifier.

12 Claims, 4 Drawing Sheets

FACIAL TRACKING DURING VIDEO CALLS USING REMOTE CONTROL INPUT

BACKGROUND

This disclosure relates generally to facial tracking during video calls, and more particularly to selecting a face for facial tracking during video calls using a remote control input.

During video calls, it is valuable to be able to track, follow, or focus the video on a specific target individual. For example, in cases where a video call includes multiple users in one room (e.g., a meeting, conference, or family video call), it may be beneficial for the displayed video data to focus on an active or speaking user. In another example, if a user moves around a room, it may be beneficial for the displayed video data to track the user's movements while cropping background data that is unimportant to the video call session.

SUMMARY

A communication system communicatively coupled to a remote control enables users to select between individuals for tracking during video calls based on remote control input. When a video call session is established between a local client device and one or more remote client devices, the local client device obtains a result of a facial detection algorithm to detect faces in the video data and transmits the video data to the display device for display to the user. The client device obtains an identifier of each of the detected faces. For example, the identifier may be a numeric identifier based on an order of detection (e.g., a first detected face is assigned an identifier 0001, a second detected face is assigned an identifier 0002, etc.). In another example, the identifier may be non-numeric (e.g., a name of a user corresponding to the detected face).

The client device initially selects a first face corresponding to a first identifier. Responsive to an input from a remote control communicatively coupled to the client device, the client device cycles to a second identifier and selects a second face corresponding to the second identifier. In response to another input using the remote control, the client device applies a center of focus operation to the selected face associated with the currently selected identifier. For example, the client device may zoom on the face, crop the video data around the face, track the face during movements through the video data, or otherwise alter the display interface.

In one example, the client device increments the first selected identifier responsive to an input corresponding to "forward" (e.g., a right-pointing arrow) or "up" (e.g., an upward-pointing arrow) and decrements the first selected identifier responsive to an input corresponding to "backward" (e.g., a left-pointing arrow) or "down" (e.g., a downward-pointing arrow). In another example, the client device cycles between the detected faces corresponding to relative positions of detected faces on the display screen.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
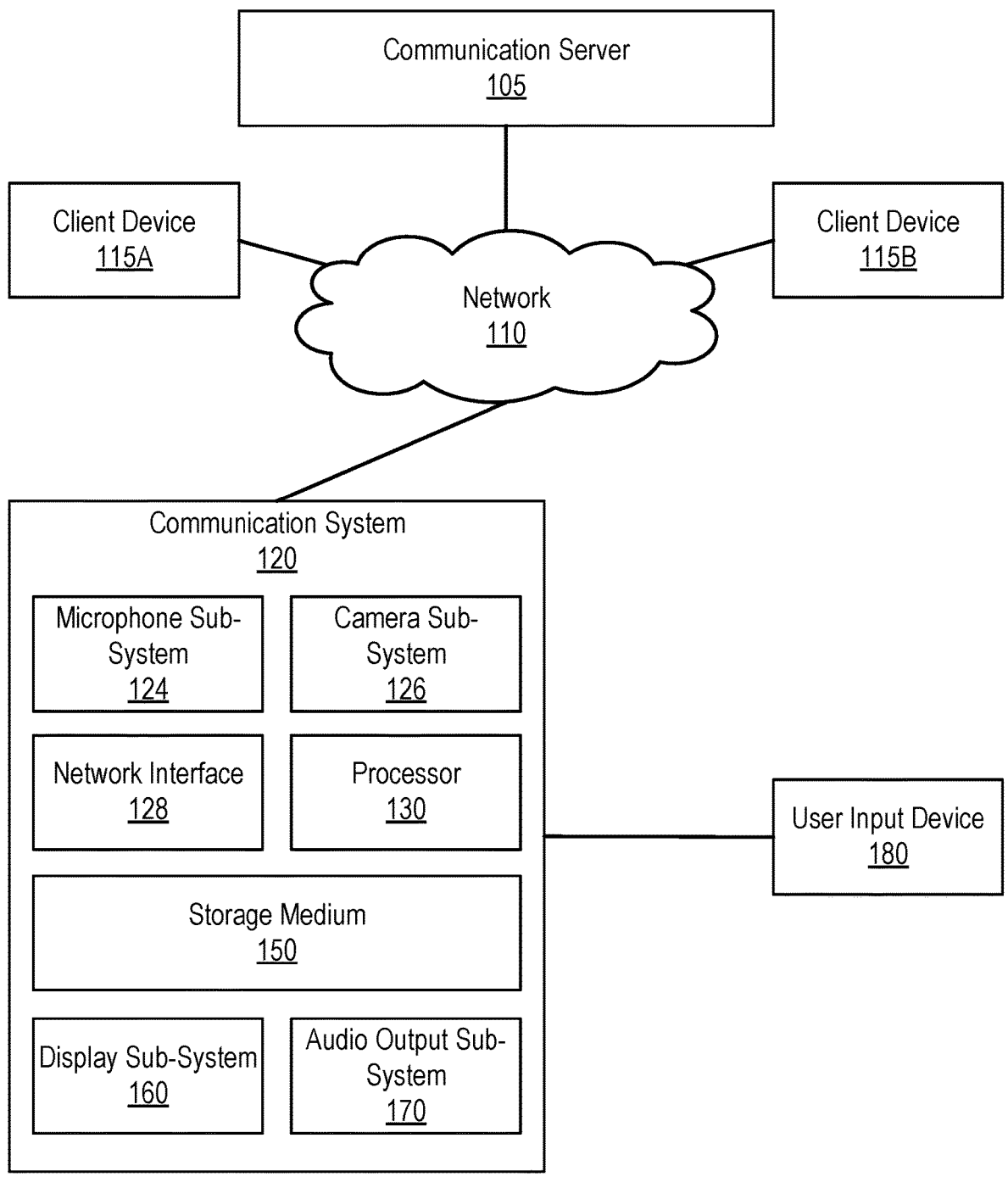
FIG. 1 is a block diagram of a system environment of a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In other embodiments, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120. In other embodiments, the communication system 120 comprises an integrated computing device that operates as a standalone network-enabled device.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The processor 130 operates in conjunction with the storage medium 150 (e.g., a non-transitory computer-readable storage medium) to carry out various functions attributed to the communication system 120 described herein. For example, the storage medium 150 may store one or more modules or applications embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 120 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 120 may output audio in multiple channels to generate beamformed audio signals that give the listener a sense of directionality associated with the audio. For example, the audio output sub-system may generate audio output as a stereo audio output or a multi-channel audio output such as 2.1, 3.1, 5.1, 7.1, or other standard configuration.

The communication system 120 is communicatively coupled to a user input device 180. In other embodiments, the communication system 120 is coupled to other, additional, or fewer devices, such as one or more user input devices 130 or one or more external display devices.

The user input device 180 comprises hardware that enables a user to interact with the communication system 120. The user input device 180 can comprise, for example, a game controller, a keyboard, a mouse, a joystick, a voice command controller, a gesture recognition controller, a remote control receiver, or other input device. In an embodiment, the user input device 180 may include a remote control device that is physically separate from the user input device 180 and interacts with a remote controller receiver (e.g., an infrared (IR) or other wireless receiver) that may integrated with or otherwise connected to the communication system 120. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

Figure 2A:
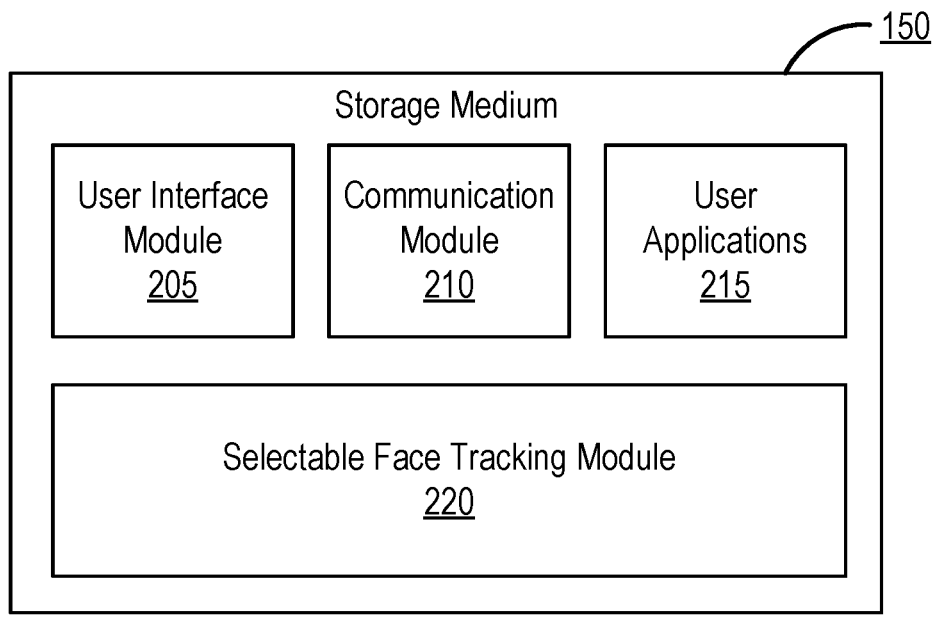
FIG. 2A is a block diagram of an architecture of a storage medium of a communication system, in accordance with an embodiment.

FIG. 2A is a block diagram of an architecture of the storage medium 150. The storage medium 150 shown in FIG. 2A includes a user interface module 205, a communication module 210, applications 215, and a selectable face tracking module 250. In other embodiments, the storage medium 150 may include additional, fewer, or different components for various applications.

The user interface module 205 comprises visual and/or audio elements and controls for enabling user interaction with the communication system 120. For example, the user interface module 205 may receive inputs from the user input device 122 to enable the user to select various functions of the communication system 120. In an example embodiment, the user interface module 205 includes a calling interface to enable the communication system 120 to make or receive voice and/or video calls over the network 110. To make a call, the user interface module 205 may provide controls to enable a user to select one or more contacts for calling, to initiate the call, to control various functions during the call, and to end the call. To receive a call, the user interface module 205 may provide controls to enable a user to accept an incoming call, to control various functions during the call, and to end the call. For video calls, the user interface module 205 may include a video call interface that displays remote video from a client 115 together with various control elements such as volume control, an end call control, or various controls relating to how the received video is displayed or the received audio is outputted.

The user interface module 205 may furthermore enable a user to access user applications 215 or to control various settings of the communication system 120. In an embodiment, the user interface module 205 may enable customization of the user interface according to user preferences. Here, the user interface module 205 may store different preferences for different users of the communication system 120 and may adjust settings depending on the current user.

The communication module 210 facilitates communications of the communication system 120 with clients 115 for voice and/or video calls. For example, the communication module 205 may maintain a directory of contacts and facilitate connections to those contacts in response to commands from the user interface module 152 to initiate a call. Furthermore, the communication module 210 may receive indications of incoming calls and interact with the user interface module 205 to facilitate reception of the incoming call. The communication module 210 may furthermore process incoming and outgoing voice and/or video signals during calls to maintain a robust connection and to facilitate various in-call functions.

The user applications 215 comprise one or more applications that may be accessible by a user via the user interface module 205 to facilitate various functions of the communication system 120. For example, the user applications 215 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 215 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 215 to customize operation of the communication system 120.

Figure 2B:
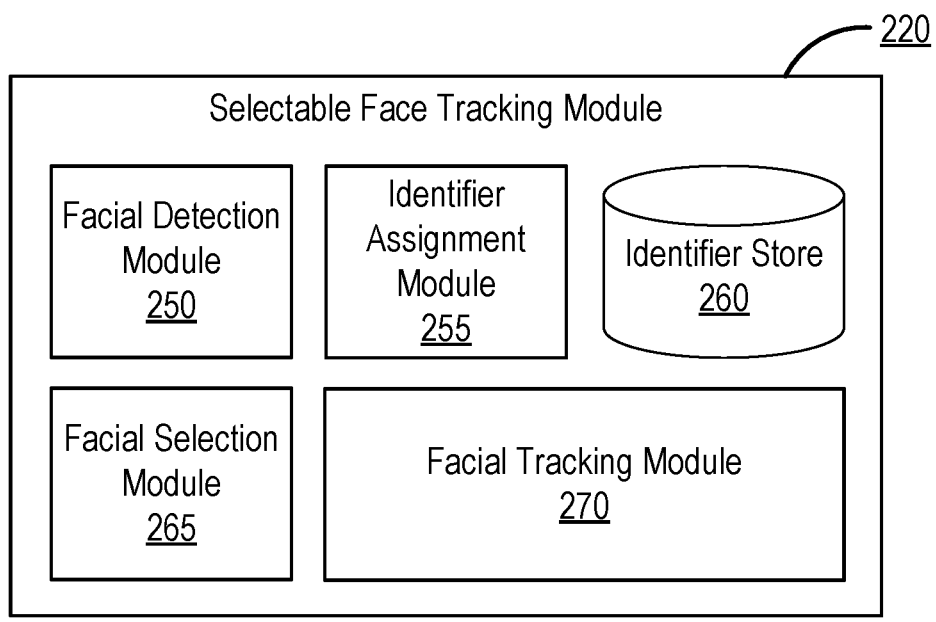
FIG. 2B is a block diagram of an architecture of a selectable face tracking module, in accordance with an embodiment.

The selectable face tracking module 220 enables selection between individuals for tracking during video calls based on inputs from the user input device 122, as described further in conjunction with FIG. 2B. In some embodiments, the selectable face tracking module 220 may be implemented on the communication server 105, a cloud server, or another server or device remote from a communication system 120 or client device 115.

FIG. 2B is a block diagram of an architecture of the selectable face tracking module 250. The selectable face tracking module 220 shown in FIG. 2B includes a facial detection module 250, an identifier assignment module 255, an identifier store 260, a facial selection module 265, and a facial tracking module 270. In other embodiments, the selectable face tracking module 220 may include additional, fewer, or different components for various applications.

The facial detection module 250 applies one or more facial detection and tracking algorithms for detecting and tracking faces during video calls. In some embodiments, the facial detection algorithm and facial tracking algorithm are one algorithm that performs both detection and tracking functions. In other embodiments, one or more separate facial detection algorithms and facial tracking algorithms are used by the facial detection module 250.

The facial detection module 250 applies a facial detection algorithm to detect faces within video data. For example, the facial detection module 250 identifies visual features in the video data that are indicative of a face. In an embodiment, the facial detection algorithm additionally includes a facial recognition algorithm that determines an identity of a detected face. The facial detection algorithm determines a respective set of bounds that frames each detected face. For example, the facial detection algorithm identifies a position and size of a bounding box that bounds a detected face. In an embodiment, face detection may be performed on each frame of video such that the movement detected face can be tracked during the video call session.

The identifier assignment module 255 assigns an identifier to each face detected during video call sessions. The identifiers may comprise ordered identifiers (e.g., numeric identifiers) that are assigned in order as each new face is detected. For example, the identifier assignment module 255 assigns a first numeric identifier (e.g., 0001) to a first detected face of a video call session. Responsive to a second face being detected in the video call session, the identifier assignment module 255 increments the numeric identifier and assigns the incremented numeric identifier (e.g., 0002) to a second detected face. Thus, as each face appears in a frame and is detected, the identifier is incremented such that the ordered set of identifiers are ordered to relative times of detection. The identifier may be furthermore incremented as additional faces are identified.

In another embodiment where the facial detection module 250 performs a facial recognition algorithm, the identifier assignment module 255 assigns user identifiers (e.g., names, usernames, unique identifiers, and the like) to detected faces based on recognized user identities by the facial recognition algorithm. In other embodiments, the identifier assignment module 255 assigns identifiers to detected faces based on other methods or algorithms. For example, the identifier assignment module 255 assigns decrementing numeric identifiers to subsequently detected faces, randomly generated numeric or alphabetic identifiers to detected faces, identifiers assigned by users of client devices 115 to detected faces, etc.

The identifier store 260 stores assigned identifiers and information describing the corresponding faces for video calls. In an embodiment, the identifier store 260 temporarily stores the assigned identifiers and information describing the corresponding faces. For example, in an embodiment wherein the identifier is a numeric identifier that is randomly assigned or assigned based on an order of detection, the identifier store 260 stores data until a video call is disconnected. In another embodiment, the identifier store 260 maintains data describing the assigned identifiers and corresponding faces across one or more video calls. For example, in an embodiment wherein an identifier specifies a user identity (e.g., a name or other user identifier), it is beneficial for the identifier store 260 to maintain data for multiple video calls, such that the identifier is correctly assigned for the multiple video calls.

During video calls, the identifier store 260 may receive and store additional information describing detected faces. For example, the identifier store 260 receives information describing a position for each detected face. The position for a detected face is described in absolute terms (e.g., XY coordinates based on a position from the video data) or in relative terms (e.g., in comparison to other faces or objects detected from the video data). In another example, the identifier store 260 receives other information, such as a length of time an identifier or a corresponding face is selected during a video call, a length of time an identifier or a corresponding face is visible during a video call, movement by a face corresponding to an identifier during a video call, and the like.

The facial selection module 265 selects identifiers and faces corresponding to identifiers during video calls for purposes of facial tracking and centering operations. The facial selection module 265 accesses the identifier store 260 to identify faces in video data and receives input from a user input device 180 to select, deselect, focus on, or otherwise interact with the identified faces.

In an embodiment, when a video call is initiated and a first face is identified and associated with an identifier, the facial selection module 265 may initially select the first face by default. For example, the facial selection module 265 selects a face associated with an identifier with a lowest numerical value, a highest numerical value, or a central position in the video data by default. In another embodiment, the facial selection module 265 selects a first face responsive to a user input via the user input device 180 to initiate the selecting.

During the video call and responsive to receiving user input via the user input device 180, the facial selection module 265 enables the user to change the selected identifier. In an embodiment where the user identifiers are numeric identifiers, the facial selection module 265 identifies when a user input is received to change the currently selected face. Based on the user input, the facial selection module 265 increments or decrements the selected numeric identifier and selects an identifier corresponding to the increment or decrement. For example, the facial selection module 265 receives a navigation input such as a "right" or "up" button input and increments the selected identifier to produce a new selected identifier. In another example, the facial selection module 265 receives a navigation input such as a "left" or "down" button input and decrements the selected identifier to produce the new selected identifier. Thus, the facial selection module 265 enables users to cycle quickly through faces detected in the video data by sequentially selecting and navigating through the different faces.

In an embodiment where the identifiers are associated with positions of the corresponding faces, the facial selection module 265 identifies when a user input is received to cycle to a new selected face based on a relative position to the currently selected face. For example, the facial selection module 265 receives a "right" button input and determines a detected face in the video data with a relative position to the right of the currently selected face. The detected face and the identifier corresponding to the detected face are selected. In cases where more than one face in the video has a relative position corresponding to the user input, the facial selection module 265 selects a closer face to the currently selected face.

The facial tracking module 270 receives information from the facial detection module 250 describing locations and bounds for faces in the video data and interfaces with the user interface module 205 to modify the video data to include a visual representation of the bounds. For example, the facial tracking module 270 modifies the video data to display the bounds for each face in the video data as a box. In other examples, the facial tracking module 270 modifies the video data to display the bounds for each face or a position for each face using another kind of visual indicator. Faces are selectable via input from a user input device 180 communicatively coupled to the communication system 120. In an example, currently selected bounds may be differentiated from bounds that are not selected (e.g., bolded, colored, dashed or undashed, or otherwise emphasized). In another example, currently selected bounds are shown via a visual representation of the bounds, while bounds that are not selected are not shown. In other examples, currently selected bounds or currently selected faces are shown via other methods of visual indication.

The facial tracking module 270 additionally receives information from the facial selection module 265 and, responsive to a user input to track a selected face, modifies video data displayed in the user interface to apply a center of focus operation to track a selected individual. Tracking may include performing one or more operations such as zooming on the selected face, cropping the video data to a specified area around the selected face, panning the video to track movements by the face through the video data, and other operations for tracking on a selected face. Responsive to a second user input from the user input device 180 to stop tracking, the facial tracking module 270 returns the video data to a default state (e.g., without zooming or cropping of the video data).

Facial Tracking During Video Calls Using Remote Control Input

Figure 3:
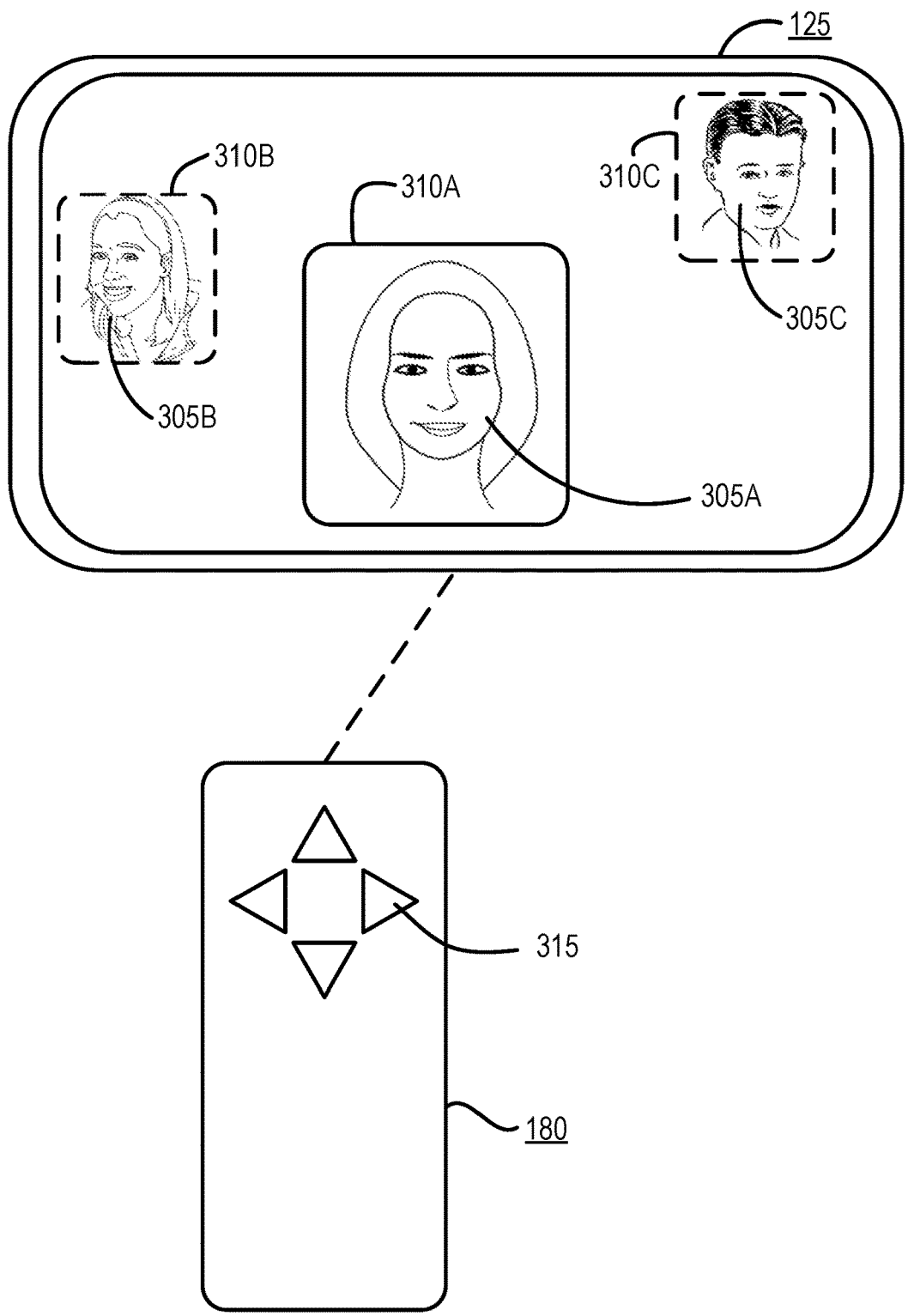
FIG. 3 is an example illustrating a method for selecting between individuals for tracking during video calls, in accordance with an embodiment.

FIG. 3 is an example illustrating a method for selecting a face for tracking during video calls using remote control input, in accordance with an embodiment.

As shown in the example of FIG. 3, the video data received during a video call includes a set of faces 305. The communication system 120 uses a facial detection algorithm to detect each face of the set of faces 305. For example, the communication system 120 detects a first face 305A, identifies a set of bounds 310A framing the first face, and obtains a first identifier to the first face. In an embodiment, the first identifier is a numeric identifier (e.g., 001). In other embodiments, the first identifier is a user identifier, name, or other non-numeric identifier (e.g., "GSmith"). Information describing the first identifier, the corresponding first face 305A, and the set of bounds 310A is stored by the communication system 120. In the example of FIG. 3, the communication system 120 also detects one or more additional faces 305B-C, identifies sets of bounds 310B-C framing the additional faces, and obtains identifiers to the additional faces. For example, the additional identifiers are incremented from the first identifier for each subsequently detected face, such that a second detected face 305B is assigned an identifier 002 and a third detected face 305C is assigned an identifier 003, and so on. In another example, the additional identifiers are assigned by other methods (e.g., decrementing, random assignment) and may be non-numeric.

The communication system 120 initially selects the first identifier by default, identifying the first face 305A corresponding to the first identifier. In some embodiments, the communication system 120 modifies the video data to display the sets of bounds 310 for the detected faces. In the example of FIG. 3, the set of bounds 310A corresponding to selected first face 305A is indicated as a solid box, while the sets of bounds 310B-C corresponding to the unselected faces 310B-C are indicated as dashed boxes. In other examples, other methods for identifying the set of bounds 310 may be used, and other methods for indicating a selected first face 305A may be used.

The communication system 120 cycles through the detected faces 305A, 305B, 305C responsive to a navigation input 315 from the user input device 180. For example, responsive to the input 315 being associated with a first direction (e.g., a right navigation input), the communication system 120 selects a second identifier based on the identifiers and the input. The communication system 120 then selects the second face corresponding to the second identifier. For example, if a currently selected identifier 005 is associated with a first face 305A, a second identifier 006 is associated with a second face 305B, and a third identifier 007 is associated with a third face 305C, and a "right" button input is received, the communication system 120 increments the selected identifier 005 to produce the second identifier 006 and selects the second face.

In another embodiment wherein the communication system 120 tracks a position of each face in the video data, the communication system 120 receives a directional button input and detects a face with a relative position corresponding to the direction of the received input. The communication system 120 selects the identifier corresponding to the detected face. For example, as in FIG. 3, wherein a first face 305A is currently selected with a position $x_1$, $y_1$ and a "right" button input is received, the communication system 120 identifies the relative positions for the other faces 305B-C in the video data and selects the second face 305C based on a relative position $x_2$, $y_2$, where the values of $x_2$, $y_2$ indicate a relative position of the second face 305C being to the right of the first face.

In other embodiments, other methods may be used by the communication system 120 to select a second identifier or a second face corresponding to a second identifier. For example, text inputs, pointers, or other inputs from the user input device 180 may be used to select a second identifier.

In an embodiment, the communication system 120 applies a center of focus operation to the identified first face 305A in response to a user input to track the selected face when the first face 305A is selected. Applying a center of focus operation may include one or more of, for example, zooming on a face, cropping video data to a specified area around the face, centering the video data on the face during movement, and the like. In one example, the communication system 120 applies the center of focus operation to a selected face responsive to an input from a user input device 180. In another example, the communication system 120 applies the center of focus operation to an identified face automatically responsive to the face being selected without necessarily requiring an additional input to initiate the center of focus operation. When a second identifier or second face is selected, the communication system 120 moves the center of focus from the first face 305A to the second face 305C.

Figure 4:
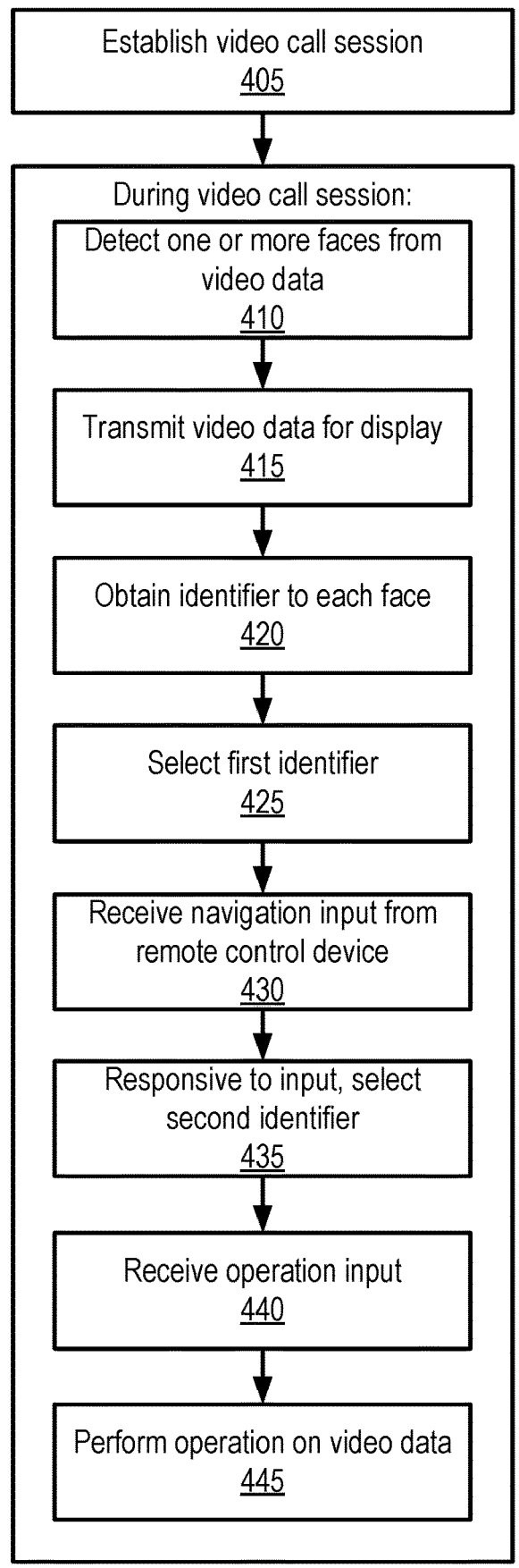
FIG. 4 is a flow diagram of a method for selecting between individuals for tracking during video calls, in accordance with an embodiment.

FIG. 4 is a flow diagram of a method facial tracking during video calls using remote control input, in accordance with an embodiment. In an embodiment, the steps of FIG. 4 are performed by a communication system 120. In another embodiment, one or more steps of FIG. 4 are performed by other entities. In various embodiments, the method may include different and/or additional steps, and the steps may be performed in different orders than those described in conjunction with FIG. 4.

The communication system 120 establishes 405 a video call session between a client device 115 and one or more remote client devices. During the video call session, the communication system 120 detects 410 one or more faces from the video data using a facial detection algorithm and transmits 415 video data associated with the video call session for display on a display device communicatively coupled to the client device. The communication system 120 obtains 420 an identifier to each face of the one or more faces. As discussed in conjunction with FIG. 2, in one embodiment, the identifier is a numeric identifier determined based on an order of detection. In other embodiments, the identifier may be non-numeric and may be assigned based on a user identity of one or more detected faces.

The communication system 120 selects 425 a first identifier. The selection identifies a first face corresponding to the first identifier. The communication system 120 receives 430 a navigation input by the user of the client device from a user input device 180 communicatively coupled to the client device. The navigation input is, for example, a button press indicating a direction (e.g., an up, down, left, or right button input). Based on the assigned identifiers and on the input, the communication system 120 selects 435 a second identifier, identifying a second face corresponding to the second identifier.

When the second identifier is selected, the communication system 120 receives 440 an operation input. The operation input specifies an operation to perform on a currently selected face, such as applying a center of focus of the video data to the currently selected face, modifying the video data to include a visual representation of bounds for the currently selected face or all detected faces, and the like. The communication system 120 performs 445 the operation on the video data with respect to the second face. For example, when the operation is a center of focus operation, the communication system 120 performs one or more operations such as zooming on the second face, cropping the video data to a specified area around the second face, or tracking the second face during movements through the video data.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   establishing a video call session between a local client device and one or more remote client devices; and
   during the video call session:
   detecting, by a facial detection algorithm, one or more faces from video data associated with the video call session;
   assigning an ordered identifier for each face of the one or more faces, the ordered identifiers ordered according to respective times of detection of the one or more faces;
   transmitting video data associated with the video call session for display on a display device;
   selecting a first ordered identifier associated with a first face;
   receiving, from a remote control device communicatively coupled to the local client device, a navigation input for cycling selection of the one or more faces, the cycling based on the ordered identifiers; and
   responsive to the navigation input, selecting a second ordered identifier, associated with a second face;
   receiving an operation input to perform an operation when the second ordered identifier is selected; and
   performing the operation on the video data with respect to the second face.

2. The method of claim 1, wherein selecting the second identifier comprises at least one of:
   incrementing the first identifier based on a first button input from the remote control device to cycle to the second identifier; and
   decrementing the first identifier based on a second button input from the remote control device to cycle to the second identifier.

3. The method of claim 1, wherein the facial detection algorithm detects bounds for each face of the one or more faces in the video data and the transmitted video data is modified to include a visual representation of the detected bounds.

4. The method of claim 1, wherein performing the operation comprises applying a center of focus of the video data to a currently selected face.

5. The method of claim 4, wherein applying a center of focus of the video data to a face corresponding to a current selected identifier further comprises one or more of: zooming on the face, cropping the video data to a specified area around the face, or tracking the face during movements through the video data.

6. The method of claim 1, further comprising tracking, by a facial tracking algorithm, positions of the one or more faces from the video data.

7. A non-transitory computer-readable storage medium storing computer program instructions executable by a processor to perform operations comprising:

establishing a video call session between a local client device and one or more remote client devices; and during the video call session:

detecting, by a facial detection algorithm, one or more faces from video data associated with the video call session;

assigning an ordered identifier for each face of the one or more faces, the ordered identifiers ordered according to respective times of detection of the one or more faces;

transmitting video data associated with the video call session for display on a display device;

selecting a first ordered identifier associated with a first face;

receiving, from a remote control device communicatively coupled to the local client device, a navigation input for cycling selection of the one or more faces, the cycling based on the ordered identifiers; and responsive to the navigation input, selecting a second ordered identifier, associated with a second face;

receiving an operation input to perform an operation when the second ordered identifier is selected; and performing the operation on the video data with respect to the second face.

8. The computer-readable storage medium of claim 7, wherein selecting the second identifier comprises at least one of:

incrementing the first identifier based on a first button input from the remote control device to cycle to the second identifier; and decrementing the first identifier based on a second button input from the remote control device to cycle to the second identifier.

9. The computer-readable storage medium of claim 7, wherein the facial detection algorithm detects bounds for each face of the one or more faces in the video data and the transmitted video data is modified to include a visual representation of the detected bounds.

10. The computer-readable storage medium of claim 7, wherein performing the operation comprises applying a center of focus of the video data to a currently selected face.

11. The computer-readable storage medium of claim 10, wherein applying a center of focus of the video data to a face corresponding to a current selected identifier further comprises one or more of: zooming on the face, cropping the video data to a specified area around the face, or tracking the face during movements through the video data.

12. The computer-readable storage medium of claim 7, further comprising tracking, by a facial tracking algorithm, positions of the one or more faces from the video data.

\* \* \* \* \*